United States Patent
Kleinhans et al.

(10) Patent No.: US 10,267,036 B2
(45) Date of Patent: Apr. 23, 2019

(54) UNIVERSAL JOINT SEALING TAPE FOR DIFFERENT PROFILE DIMENSIONS AND SEAL ARRANGEMENT HAVING SUCH A JOINT SEALING TAPE

(71) Applicant: HILTI AKTIENGESELLSCHAFT, Schaan (LI)

(72) Inventors: Gottfried Kleinhans, Waal (DE); Manfred Klein, Kaufering (DE)

(73) Assignee: HILTI AKTIENGESELLSCHAFT, Schaan (LI)

( * ) Notice: Subject to any disclaimer, the term of this patent is extended or adjusted under 35 U.S.C. 154(b) by 0 days.

(21) Appl. No.: 15/535,655

(22) PCT Filed: Feb. 12, 2016

(86) PCT No.: PCT/EP2016/053013
§ 371 (c)(1),
(2) Date: Jun. 13, 2017

(87) PCT Pub. No.: WO2016/128552
PCT Pub. Date: Aug. 18, 2016

(65) Prior Publication Data
US 2018/0002917 A1    Jan. 4, 2018

(30) Foreign Application Priority Data

Feb. 13, 2015 (EP) ................................. 15155100
Feb. 13, 2015 (EP) ................................. 15155101
(Continued)

(51) Int. Cl.
*E04B 2/82* (2006.01)
*B29C 44/32* (2006.01)
(Continued)

(52) U.S. Cl.
CPC ............ *E04B 2/82* (2013.01); *B29C 44/324* (2013.01); *E04B 1/68* (2013.01); *E04B 1/82* (2013.01);
(Continued)

(58) Field of Classification Search
CPC ........ E04B 2/82; E04B 2/7411; E04B 2/7457; E04B 1/68; E04B 1/948; E04F 13/042; E04F 21/1657; E06B 7/2314
(Continued)

(56) References Cited

U.S. PATENT DOCUMENTS 3,391,037 A * 7/1968 McNulty ............... E04F 13/042
                                                          156/280
5,246,775 A * 9/1993 Loscuito ................. E04F 13/04
                                                          428/343
(Continued)

FOREIGN PATENT DOCUMENTS

DE    295 03 352 U1    5/1995
DE    101 29 626       11/2002
(Continued)

OTHER PUBLICATIONS

International Search Report dated Apr. 20, 2016 in PCT/EP2016/053013 filed Feb. 12, 2016.

*Primary Examiner* — Brian E Glessner
*Assistant Examiner* — Adam G Barlow
(74) *Attorney, Agent, or Firm* — Grüneberg and Myers PLLC (57) ABSTRACT

A joint sealing tape can be universally used for different profile dimensions, for sealing building joints, particularly for sealing them with regard to noise and/or smoke and with regard to fire. In particular, the joint sealing tape can be used for sealing a joint between a first component and a second component, having an elongated connection element and at
(Continued)

least two sealing elements, which are positioned on the connection element at a distance from and next to one another, running in the longitudinal direction of the connection element, and wherein the connection element has a perforation.

20 Claims, 6 Drawing Sheets (30) Foreign Application Priority Data

| Feb. 13, 2015 | (EP) | 15155102 |
|---|---|---|
| Feb. 13, 2015 | (EP) | 15155103 |
| May 11, 2015 | (EP) | 15167086 |

(51) Int. Cl.
*E04B 2/74* (2006.01)
*E04B 1/68* (2006.01)
*E04B 1/82* (2006.01)
*E04B 1/94* (2006.01)
*B29L 31/26* (2006.01)
*B29K 75/00* (2006.01)

(52) U.S. Cl.
CPC ............ *E04B 1/948* (2013.01); *E04B 2/7411* (2013.01); *E04B 2/7457* (2013.01); *B29K 2075/00* (2013.01); *B29L 2031/26* (2013.01)

(58) Field of Classification Search
USPC ............... 52/98, 417, 481.1, 272, 287.1
See application file for complete search history.

(56) References Cited

U.S. PATENT DOCUMENTS

| 5,368,907 | A | * | 11/1994 | Conboy | E04F 13/04 428/167 |
|---|---|---|---|---|---|
| 5,475,948 | A | * | 12/1995 | Parke | E06B 7/2316 49/470 |
| 5,501,045 | A | * | 3/1996 | Wexler | E06B 5/164 52/232 |
| 6,418,688 | B1 | | 7/2002 | Jones, Jr. | |
| 6,434,899 | B1 | * | 8/2002 | Fortin | E06B 5/164 49/501 |
| 7,681,365 | B2 | * | 3/2010 | Klein | E04B 2/7411 52/1 |
| 8,590,231 | B2 | * | 11/2013 | Pilz | E04B 2/7411 52/232 |
| 9,512,614 | B2 | * | 12/2016 | Klein | E04B 2/7411 |
| 2011/0214371 | A1 | * | 9/2011 | Klein | E04B 1/94 52/232 |
| 2013/0031856 | A1 | * | 2/2013 | Pilz | E04B 2/7457 52/232 |
| 2013/0205694 | A1 | * | 8/2013 | Stahl | E04B 2/7411 52/232 |
| 2013/0219815 | A1 | | 8/2013 | Pilz et al. | |
| 2015/0013254 | A1 | * | 1/2015 | Pilz | E04B 2/7457 52/232 |
| 2015/0089893 | A1 | * | 4/2015 | Rosenthal | B32B 37/14 52/417 |
| 2015/0135622 | A1 | * | 5/2015 | Muenzenberger | E04B 1/948 52/407.1 |
| 2015/0275506 | A1 | * | 10/2015 | Klein | E04B 1/68 277/628 |
| 2015/0275510 | A1 | * | 10/2015 | Klein | E04B 1/948 52/232 |
| 2017/0314257 | A1 | * | 11/2017 | Foerg | E04B 2/7411 |
| 2018/0010333 | A1 | * | 1/2018 | Foerg | E04B 2/7411 |

FOREIGN PATENT DOCUMENTS

| EP | 0 102 103 A1 | 3/1984 |
|---|---|---|
| GB | 1 494 854 A | 12/1977 |
| WO | 01/71123 | 9/2001 |

* cited by examiner

UNIVERSAL JOINT SEALING TAPE FOR DIFFERENT PROFILE DIMENSIONS AND SEAL ARRANGEMENT HAVING SUCH A JOINT SEALING TAPE

This application is a National Stage entry under § 371 of International Application No. PCT/EP2016/053013, filed on Feb. 12, 2016, and which claims priority to the following European Patent Application Nos.: i) 15167086.6, filed on May 11, 2015; ii) 15155103.3, filed on Feb. 13, 2015; iii) 15155102.5, filed on Feb. 13, 2015; iv) 15155100.9, filed on Feb. 13, 2015; and v) 15155101.7, filed on Feb. 13, 2015.

FIELD OF THE INVENTION

The present invention relates to a universal joint sealing tape for different profile dimensions of a drywall framework, for sealing of building joints, particularly for sealing with regard to noise and smoke, and, if applicable, with regard to fire. In particular, the invention relates to acoustical, smoke-proof and/or fire-proof sealing of connection joints, particularly expansion joints, in the case of a drywall.

BACKGROUND OF THE INVENTION

Connection joints generally occur when different components make contact with one another. Connection joints are found in the connection region with the floor and with solid walls. In buildings, lowering or lifting of the ceiling can come about due to weight stress or thermal influences. In order to prevent damage to the drywall, in this case the upper connection joint is implemented as an expansion joint. Therefore, joints that interrupt components and prevent stress cracks are referred to as expansion joints. The ceiling profile is implemented in such a manner that relative movement between the ceiling profile and the perpendicular wall components is possible.

In general, a U profile, which is part of the framework, is attached to the connecting components. Usual U profiles with which the work is done are, in particular, U profiles having profile widths of 2½ inches (64 mm), 3⅝ inches (92 mm), 4 inches (102 mm), 6 inches (152 mm), 8 inches (203 mm), and 10 inches (254 mm). The gypsum boards themselves are affixed to the connecting component at a defined distance. Usually, sealing of the system takes place in the gap between the gypsum board and the ceiling. For this purpose, either a suitable sealing compound is introduced, or the gap is filled with mineral wool and provided with a sealing layer on the surface. In both cases, the material situated in the joint prevents movement relatively strongly, with the result that in order to achieve sufficient movement absorption, the work has to be done with relatively great joint widths.

In particular, sealing of the gap with sealing compound has some disadvantages. It is particularly labor-intensive and the seal tends to form cracks over time, if it is subjected to excessive stress. Furthermore, sealing can only take place after installation of the gypsum boards, and requires access to the finished drywall on both sides. In addition, this method of procedure is prone to errors, since the user himself/herself must meter in the correct amount of material in order to seal the gap sufficiently. Also, the drywall builder must dimension the width of the joint in accordance with the material properties and expansion properties of the sealing compound. During installation of the sealing compound, only the joint can be filled at that point. If the gap expands, it must be guaranteed that the sealing compound adheres strongly enough to the substrate and is able to absorb the tensile forces that occur. Frequently, this is not the case, and the risk exists that the sealing compound comes loose from the substrate or that the sealing compound itself is subjected to excessive stress and therefore tears. In the case of a reduction in the gap, the sealing compound can be compressed only to a limited extent, because of its material properties, and the risk exists that it will be pressed out of the gap if the joint is dimensioned incorrectly. Because of the limited expansion and compression capacity of the sealing compound (max. +/−25%), dimensioning the distance between the gypsum board and the ceiling to be sufficiently large has great importance. This is frequently underestimated, and therefore a sufficient seal often cannot be guaranteed when using usual sealing compounds.

Some other solutions exist for sealing joints, particularly joint cords or joint sprays, some of which have the same disadvantages as described for sealing compounds.

Furthermore, a specially dimensioned sealing tape has to be produced for every profile width of the U profile of a drywall framework, because on a construction site, work is performed with different profile widths of the U profiles, particularly for the 2½ inch (64 mm), 3⅝ inch (92 mm), 4 inch (102 mm), 6 inch (102 mm), 8 inch (203 mm), and 10 inch (254 mm) rail. Therefore, sealing tapes of different widths have to be available to a drywall builder or user, or he/she must cut them to size from a usual sealing tape, something that is very labor-intensive and uneconomical.

It is therefore the object of the invention to provide a joint sealing tape that avoids the disadvantages of the known materials, and, in particular, can be used more simply and more reliably, simplifies installation of further components, already guarantees a good seal during its use, guarantees excellent tightness with maximal expansion absorption, and, at the same time, can be universally used for different profile widths of the U profile of a drywall framework, particularly for the usual profile widths of 2½ inches (64 mm), 3⅝ inches (92 mm), 4 inches (102 mm), 6 inches (152 mm), 8 inches (203 mm), and 10 inches (254 mm).

A further object of the present invention is to provide an arrangement that allows better sealing of the joint between two components in the event of a fire, particularly between a drywall and a connecting component, such as a wall, a ceiling or a floor, and thereby makes available a better and permanent seal with regard to noise and/or smoke, and, if applicable, better and permanent fire protection, and can be installed with less work effort, in reliable and error-free manner, even for different profile dimensions of a drywall framework.

These and other objects that are evident from the following description of the invention are solved by the present invention as it is described in the independent claims. The dependent claims relate to preferred embodiments.

SUMMARY OF THE INVENTION

The present invention relates to a joint sealing tape for sealing a joint between a first component and a second component, having an elongated connection element and at least two sealing elements, which are positioned on the connection element at a distance from and next to one another, running in the longitudinal direction of the connection element, which tape is characterized in that the connection element has a perforation. Preferably, the sealing elements are positioned at the outer edge of the connection element.

The present invention furthermore relates to a sealing arrangement for sealing a joint between two components adjacent to one another, having at least a first component, a second component, and the joint sealing tape according to the invention.

Other objects and characteristics of this invention are obvious, in part, and are explained hereinafter, in part. In particular, the object of the present invention is described in detail, making reference to the following figures:

DETAILED DESCRIPTION OF THE INVENTION

The following terms are used within the scope of the present invention:

The term "geometries" within the scope of the present invention comprises different cross-section types and cross-section forms. This means that the sealing elements, in particular, can have different cross-section types and cross-section forms. Cross-section types are understood to be, among other things a round profile (round cross-section), oval profile (oval cross-section), polygonal profile (polygonal cross-section), particularly square profile (square cross-section), rectangular profile (rectangular cross-section), parallelogram profile (cross-section in the form of a parallelogram), triangular profile (triangular cross-section), etc. However, other or mixed cross-section forms are conceivable and possible, such as, for example, a rectangular profile having rounded corners. Cross-section forms are understood to be, among other things, a solid profile and a hollow profile, wherein in the case of the solid profile, the sealing elements consist entirely of sealing material, whereas in the case of the hollow profile, the sealing elements consist only partially of sealing material.

The term "deformable" within the scope of the present invention means that uneven areas in the component can be balanced out, against which areas the sealing elements are pressed. "Plastically deformable" means, in this regard, that the sealing elements are deformable and do not return to their original shape after the deformation. "Elastically deformable" means, in this regard, that the sealing elements are deformable and return to their original shape after the deformation, i.e. that the material can be reversibly deformed to a certain degree.

The terms "has/have," "having," and "has/have" are supposed to be inclusive and mean that other elements aside from those mentioned can also be intended.

The term "intumescence" within the scope of the present invention means, in this regard, that the material expands under the effect of heat, for example in the event of a fire, and forms an insulating layer composed of flame-retardant material, in other words it intumesces.

Within the scope of the present invention, "foam material that burns off slowly" is understood to be a foam material that offers no possibility of spreading the fire through the foam material, is not inherently flammable, and also does not drip as it burns.

"Positioned in the upper region of the joint" means that the sealing elements are particularly disposed laterally on the first component, in this regard.

Used within the scope of the present invention, the singular forms "a" and "an" also include the corresponding plural forms, unless the context clearly permits a different conclusion. Therefore, the term "a," for example, is supposed to mean "one or more" or "at least one," unless indicated otherwise.

In one aspect, the present invention relates to a joint sealing tape for sealing a joint between a first component and a second component, having an elongated connection element and at least two sealing elements, which are positioned on the connection element at a distance from and next to one another, running in the longitudinal direction of the connection element, which tape is characterized in that the connection element has a perforation.

In a further aspect, the present invention relates to a sealing arrangement for sealing a joint between two components adjacent to one another, having at least a first component, a second component, and the joint sealing tape described above, wherein the joint sealing tape is positioned in the upper region of the joint and configured for sealing the joint from the outside.

It has been found that the joint sealing tape according to the invention is particularly suitable for reliably sealing a building joint between two adjacent components, particularly with regard to noise and/or smoke and, if applicable, also with regard to fire, and that the joint sealing tape can be universally used, at the same time, for different profile widths, particularly a U profile of a drywall framework. In order for the joint sealing tape to be able to fulfill its function, the connection element of the joint sealing tape must have a perforation. Furthermore, it is advantageous that the sealing elements of the joint sealing tape have a predetermined geometry.

Therefore, it is the objective of the present invention to describe the joint sealing tape. In particular, it is the objective of the present invention to describe the geometry of the sealing elements and the connection element of the joint sealing tape, which has a perforation, in detail. Furthermore, it is the objective of the present invention to describe the positioning of the joint sealing tape, particularly a sealing arrangement.

The joint sealing tape according to the invention, for sealing a joint between a first component and a second component, having an elongated connection element and at least two sealing elements that are positioned on the connection element at a distance from and next to one another, running in the longitudinal direction of the connection element, is characterized in that the connection element has a perforation.

The perforation of the connection element preferably runs in the center of the connection element, i.e. in the longitudinal direction of the joint sealing tape. This perforation allows easy separation (tearing apart) or alternatively pulling apart of the two joint sealing tape halves. By means of tearing them apart, without the use of a tool, two separate joint sealing tape halves can easily be produced, which both possess a sealing element, and which can be used, with the aid of an adhesion fixture, such as, for example, a separate adhesive tape or adhesive spray, and either for a one-sided seal or for wider U profiles, particularly U profiles having profile widths of more than 10 inches (254 mm). It is also possible that the joint sealing tape is provided with self-adhesive fixtures before separation, so that after it is torn apart, two half tapes are formed, which can immediately be installed without further aids. The joint sealing tape halves are therefore universally usable for different profile dimensions.

The sealing elements of the joint sealing tape according to the invention for sealing a joint between a first component and a second component have a predetermined geometry. Geometries within the scope of the present invention comprise, as already mentioned above, different cross-section types and cross-section forms.

Preferred cross-section types of the sealing elements according to the present invention are solid profile and hollow profile, wherein the hollow profile can be a closed or an open hollow profile. Solid profiles and hollow profiles having a great profile wall thickness have the advantage that automatically, no gap occurs at the join of two sealing elements that touch one another. Hollow profiles can be compressed to a greater extent, and thereby can absorb more expansion. It is particularly preferred that the sealing elements have a solid profile.

Preferred cross-section forms of the sealing elements according to the present invention are round profile and polygonal profile, particularly rectangular profile, square profile, oval profile, parallelogram profile, and triangular profile. Round profile and rectangular profile are particularly preferred, with rectangular profile being most preferred. However, other or mixed cross-section forms are also conceivable and possible, such as, for example, a rectangular profile having rounded corners, as long as the sealing elements border on the two components after installation of the joint sealing tape and can close off the joint that exists between the two components. Preferably, the sealing elements are positioned on the outer edge of the connection element.

In a preferred embodiment of the joint sealing tape according to the invention, the sealing elements have a round profile.

In a further preferred embodiment of the joint sealing tape according to the invention, the sealing elements have an oval profile.

In yet another preferred embodiment of the joint sealing tape according to the invention, the sealing elements have a rectangular profile having rounded corners.

In a particularly preferred embodiment of the joint sealing tape according to the invention, the sealing elements have a solid profile and a round profile.

In yet another particularly preferred embodiment of the joint sealing tape according to the invention, the sealing elements have a solid profile and an oval profile.

In yet another particularly preferred embodiment of the joint sealing tape according to the invention, the sealing elements have a solid profile and a rectangular profile having rounded corners.

The geometry of the sealing elements can be prefabricated, for example produced by means of defined cutting to shape, extrusion or pressing of suitable sealing material, or directly from flat material, for example by means of folding or rolling from a flat starting material, such as, for example, woven fabric, particularly composed of a non-flammable material, such as inorganic fibers, for example glass fibers, a nonwoven fabric or the like. The production of such cross-section types and cross-section forms is known to a person skilled in the art. It is preferred that the geometry of the sealing elements is prefabricated by means of defined cutting to shape or extrusion. It is particularly preferred that the geometry of the sealing elements is prefabricated by means of extrusion.

The sealing elements according to the invention can be produced from or consist of a material in one piece, or can be produced from or consist of multiple materials in multiple parts, and be present as a layered body, for example. In alternative embodiments, the outer region and the inner region of a sealing element can define separate regions of the sealing element, which have different cross-section forms and/or cross-section types and/or can consist of different materials.

According to the invention, the sealing elements consist of a deformable material. The material can be either plastically or elastically deformable, in this regard. In particular, the sealing elements consist, at least in part but preferably entirely of a material that resumes its shape after compression, such as, for example, foam material, foam rubber, cellular rubber or the like. The sealing elements according to the invention preferably consist of a soft foam material that resumes its shape after compression. Possible foam materials that can be mentioned are usual foam materials such as polyethylene foam material and polyurethane foam material or cellular rubber. In this regard, the foam material can be an open-cell foam material with very low air passage resistance, also an almost closed-cell foam material with extremely low air passage values. Foam materials having air passage values that lie between the two extreme cases mentioned above can also be used within the scope of the present invention. The foam material can be saturated with an impregnate that increases the sealing properties of the foam material. In order to achieve a seal with regard to smoke, at least the outer surface of the sealing element should be configured with closed pores. Alternatively, an open-cell sealing element can be provided with cover layer or mantling, for example composed of a film, particularly a plastic film. The cover layer or the mantling can be formed by the connection element or by a separate material. It is preferred that the sealing elements consist of an open-cell polyurethane foam material or of a cellular rubber.

It has proven to be advantageous if the sealing elements consist of a slow-burning foam material, such as, for example, cellular rubber or polyurethane foam. In the case of a slow-burning foam material, there is no possibility of fire spreading through the foam material.

Independent ignition is excluded in the case of the aforementioned foam materials as starting materials. It is advantageous that in the event of a fire, dripping also does not take place. In a temperature range between 500° C. to 800° C., a slow-burning foam material should still possess at least 20%, at least 25%, preferably still at least 30%, between 20% to 60%, between 20% to 40%, preferably between 25% to 30% of its initial volume. Furthermore, in a temperature range between 500° C. to 800° C., a slow-burning foam material should still possess at least 10%, at least 20%, preferably still at least 30%, between 10% to 40%, between 10% to 30%, preferably between 15% to 20% of its initial mass.

Furthermore, if fire protection properties, such as intumescence, for example, are desired, the material can contain corresponding additives. Under the effect of heat, as in the event of a fire, the material inflates and forms an insulating layer composed of material having low flammability. The formation of a voluminous insulating layer, namely an ash layer, can occur as the result of the chemical reaction of a mixture composed of corresponding compounds coordinated with one another, which react with one another under the effect of heat. Such systems are known to a person skilled in the art under the term chemical intumescence, and can be used according to the invention. Alternatively, the voluminous insulating layer can be formed by means of inflation of a single compound, which releases gases without a chemical reaction between two compounds having taken place, under the effect of heat. Such systems are known to a person skilled in the art under the term physical intumescence and can also be used according to the invention. The two systems can be used alone or together, in each instance, as a combination, according to the invention.

In some embodiments, it is also sufficient if solely the connection element is tight with regard to smoke and/or gases.

In a preferred embodiment of the joint sealing tape according to the invention, the sealing elements consist of an open-cell foam.

In a further preferred embodiment of the joint sealing tape according to the invention, the sealing elements consist of a closed-cell foam.

In a particularly preferred embodiment of the joint sealing tape according to the invention, the sealing elements consist of an open-cell polyurethane foam.

In a further particularly preferred embodiment of the joint sealing tape according to the invention, the sealing elements consist of a cellular rubber.

The connection element can consist of a deformable material, which is the same as that of the sealing elements, of a film, for example a plastic film, of a woven fabric, particularly composed of a non-flammable material, such as inorganic fibers, for example glass fibers, a nonwoven fabric or the like. It is preferred that the connection element consists of a deformable material that is the same as that of the sealing elements or of a film.

The connection element can be produced in one piece from one material or in multiple pieces, also from different materials. It is preferred that the connection element is composed of a deformable material and is sheathed by a film, at least in part. The connection element can have different thicknesses, as the result of production conditions.

The joint sealing tape according to the invention can be produced in one piece from one material or in multiple pieces, also from different materials. It is preferred that the joint sealing tape consists of multiple units/materials. It is particularly preferred that the sealing elements consist of deformable material and that the connection element consists, at least in part, of deformable material. It is most preferred that the sealing elements consist of deformable material and the connection element consists at least in part of deformable material, and that the joint sealing tape is sheathed by a film, preferably a plastic film.

In an embodiment of the joint sealing tape according to the invention, the sealing elements are firmly connected with the connection element at least over part their circumference. In this way, a firm connection is created between the connection element and the sealing elements, so that even in the case of severe stress on the attachment region and partial loosening of the sealing element from the connection element, the sealing elements are prevented from coming completely loose from the connection element.

In a further embodiment of the joint sealing tape according to the invention, the sealing elements are firmly connected with the connection element over their entire circumference. In this way, for one thing an optimal and permanent attachment of the sealing element to the connection element is achieved, which makes loosening of the sealing element from the connection element almost impossible. For another thing, if the connection material is smoke-gas-tight, an open-cell foam material can be used for the sealing elements.

In a preferred embodiment of the joint sealing tape according to the invention, the sealing elements and the connection element can be produced from one material and accordingly can be firmly connected with one another and sheathed by a film, preferably a plastic film.

The region of the connection element, that lies between the two sealing elements, more precisely between the two points of attack of the connection element on the sealing element, defines a contact region that consists only of the connection element. In this regard, the contact region is dimensioned in such a manner that it approximately corresponds to the width of the crosspiece of the U profile. In this way, installation and, in particular, positioning of the joint sealing tape on the crosspiece of the U profile are facilitated. It is preferred that the contact region of the joint sealing tape according to the invention has a width in the range of about 30 mm to about 300 mm, preferably in the range of about 50 to 250 mm, and more preferably in the range of about 90 to 155 mm. It is particularly preferred that the contact region of the joint sealing tape according to the invention has a width of 67 mm for a 2½ inch (64 mm) rail, of 95 mm for a 3⅝ inch (92 mm) rail, of 105 mm for a 4 inch (102 mm) rail, of 155 mm for a 6 inch (152 mm) rail, of 206 mm for an 8 inch (203 mm) rail or of 257 mm for a 10 inch (254 mm) rail. It is most preferred that the contact region of the joint sealing tape according to the invention has a width of 95 mm for a 3⅝ inch (92 mm) rail or of 155 mm for a 6 inch (152 mm) rail.

In order to obtain different profile dimensions, particularly different widths of the contact region, the connection element of the joint sealing tape according to the invention can furthermore have at least one widening element. It is preferred that the widening element is present in the form of a loop. The widening element consists of a deformable material, a plastic film, a woven fabric, a nonwoven fabric or the like, preferably of a plastic film.

This widening element is attached to the top or underside of the connection element, in such a manner that a loop is formed. Attachment takes place by means of sewing it on, gluing it on or welding it on, preferably by means of welding it on. The dimension of the loop is sized in such a manner that after the two joint sealing tape halves are pulled apart, the desired width for an alternative profile is formed by means of separation of the perforation of the connection element. Thus, a second profile dimension can be obtained by means of a separation step, i.e. the joint sealing tape can simultaneously be used for a 3⅝ inch (92 mm) or a 6 inch (152 mm) rail, for example.

Furthermore, the joint sealing tape according to the invention can have one or more additional widening elements in the form of loops. These additional widening elements can be obtained in that the loop of the at least one widening element is still divided one or more times with a welding seam, so that several profile widths can be covered with one product, by means of corresponding separation of the seam or seams. In particular, the common U profiles having profile widths of 2½ inches (64 mm), 3⅝ inches (92 mm), 4 inches (102 mm), 6 inches (152 mm), 8 inches (203 mm), and 10 inches (254 mm) can be covered by means of the one or by means of the multiple widening elements. In this way, installation and, in particular, positioning of the joint sealing tape on the crosspiece of the U profile are facilitated. For facilitation of the selection of the desired width of the joint sealing tape for a specific profile, the widening elements can be provided with markings for the specific profile sizes. Because of the flexibility of the widening element, however, it is possible to also cover different profile widths of U profiles of a drywall framework with the joint sealing tape according to the invention and to seal the joint.

By means of the joint sealing tape according to the invention, a universal product for different profile sizes and applications is made available, which can furthermore be produced on a production line, in cost-advantageous manner.

If the joint sealing tape is produced in multiple parts, positioning of the sealing elements on the connection element takes place by means for attachment, for example in the form of an adhesive layer, particularly a self-adhesive layer, in the form of means that have a shape-fit of force-fit connection effect, such as suitable profilings, or by means of welding, for example thermal welding or ultrasound welding or the like. Positioning of the sealing elements on the connection element by means of an adhesive layer or welding is preferred. In the case of one-piece joint sealing tapes, positioning is predetermined by the production conditions.

The dimension and the material of the joint sealing tape, particularly not only of the sealing element but also of the connection element, are selected in accordance with the planned use of the joint sealing tape.

In general, the dimension of the sealing elements is selected as a function of the profile types used and of the material used. The dimension must be selected in such a manner that the sealing element fills the gap between the gypsum board and the ceiling and lies against both the ceiling and the gypsum board. If vertical movement of the gypsum boards is to be permitted, the sealing element must follow the movement of the gypsum board, so that the contact with the gypsum board is not interrupted and no gap can occur between sealing element and gypsum board. For this purpose, the sealing element preferably consists of a material that can recover its shape and is compressible, and during installation, the gypsum boards are pre-compressed accordingly, so that a downward movement of the gypsum board, increasing the gap between it and the ceiling, can be followed. The pre-set freedom of movement of the gypsum board therefore determines the dimension of the sealing elements.

As an example, it should be mentioned that the height of the narrow side of rectangular sealing elements, for example, is selected as a function of the desired use of the sealing elements, wherein in the case of single planking, the height is selected to be approximately the thickness of a gypsum board, and in the case of double planking, the height is selected to be about twice the thickness of a gypsum board. However, it is also possible to use the joint sealing tape designed for double planking in the case of single planking.

As an example, it should also be mentioned that material and geometry of the sealing element can be selected in such a manner that its hardness or compressibility is set so that solely due to the inherent weight of the gypsum board in the floor region of the sealing elements, compression takes place to a defined height, for example by means of a two-layer structure of the sealing elements composed of foam material having different compression density. In this way, a correct distance between floor and sheetrock can be set without further measuring. This is particularly necessary if damage to the gypsum board caused by rising wetness is to be prevented.

Positioning of the sealing elements on a component can take place by means of a connection element, in one step. It is also possible that the connection element and/or the sealing elements in turn have means for attachment on a component, such as a drywall profile, for example in the form of a self-adhesive layer, in the form of means that have a shape-fit or force-fit connection effect, such as suitable profilings or the like; optionally, individual positioning of the sealing elements is possible, for example if the joint sealing tape is separated at the perforation and two joint sealing tape halves are obtained. However, the joint sealing tape according to the invention is preferably positioned on a component in one step.

To create a sealing arrangement according to the invention, the joint sealing tape according to the invention is positioned on a first component before the first component is affixed, and then attached together with it on a second component, in usual manner, for example by screwing it on or nailing it on. Preferably, the first component is a frame profile of a drywall framework, for example a U profile, and the second component is a wall, a ceiling or a floor of a building. Particularly preferably, the first component is a U profile, and the second component is a ceiling. With this arrangement, the joint sealing tape is positioned in the upper region of the joint and configured for sealing the joint from the outside.

In one possibility for sealing a connection joint in drywall construction, the joint sealing tape is positioned on a U profile before the profile is affixed to the connecting components, such as a ceiling, for example, and then attached to the ceiling together with the profile. In a further work step, the gypsum boards, in one or two layers, are pressed against the sealing element on the edge side, so that in the case of double planking, the two gypsum boards come into contact with the sealing element with their top edge, in each instance, and thereby sealing of the joint is achieved. In order to permit movement of the gypsum board(s), without a gap between the sealing element and the gypsum board or the gypsum boards occurring at the maximal movement, the sealing element must be compressed during installation of the gypsum board(s).

In this regard, the material and the thickness of the sealing element is selected, in each instance, so that the sealing element does not hinder movement of the gypsum board(s) and, in the case of a maximal joint width, the top edge of the gypsum board(s) continues to touch the sealing element, in order to ensure sufficient sealing with regard to gas. The width of the sealing element is preferably selected so that it approximately corresponds to twice the width of a gypsum board. It has been shown that sufficient sealing can be achieved even of the width of the sealing elements corresponds to the width of only one gypsum board.

When placing the joint sealing tape on the U profile and abutted to the ceiling, uneven areas in both components can be balanced out, and simple positioning without adhesion is possible. Furthermore, the joint distance can be controlled by means of the subsequent positioning of the gypsum board and by the selection of the sealing materials and/or geometry configuration of the joint sealing tape.

Alternatively, when using only one gypsum board, this can be installed not abutting the sealing element from below, but rather so that the gypsum board partially overlaps with the sealing element. As a result, the gypsum board partially projects beyond the sealing element, and the overlapping part of the sealing element is pressed between the U profile and the gypsum board. It has been shown that in this way, too, sufficient sealing, particularly with regard to gases, can be achieved. To improve the seal and/or the sliding properties, the sealing tap can be laminated on one side with a layer composed of a material that neither hinders the movement of the gypsum board nor is destroyed by the latter, such as a plastic film. The position marking for the gypsum board can be easily applied to a film, for example.

In this method of installation, great absorption of expansion in comparison with the joint width is possible. Furthermore, this method of installation is easier to use than the single or double planking mentioned above, because the gypsum board can simply be installed on the sealing element without any distance measurement. When using a positioning marking, the gypsum board can be installed without a distance measurement. Furthermore, when using this installation method, one is not restricted to using easily compressible materials for the sealing elements and therefore has relatively great freedom in the selection of the material.

In a further particularly preferred alternative, sealing of the joint can be achieved if, in the case of double planking, the two gypsum boards installed with horizontal offset, in such a manner that the outer one of the two gypsum boards (also referred to as the outer, second gypsum board) is installed higher (i.e. closer to the ceiling) than the inner gypsum board (also referred to as the inner, first gypsum board). In this embodiment, the thickness of the sealing element is selected in accordance with the thickness of a gypsum board. The first, inner gypsum board is installed in such a manner that its upper edge touches the face surfaces of the sealing element, wherein no or little pre-compression of the sealing element is required. The second, outer gypsum board is affixed with horizontal offset, i.e. it is installed higher than the first, inner gypsum board, so that it partially covers the sealing element. In this regard, the sealing element and the gypsum board should be adjacent to one another to form a seal, in order to seal the gap between the outer, second gypsum board and the sealing element, particularly with regard to gases. In this way, sealing takes place between the sealing element and the second component, for example a ceiling, a wall or a floor, as well as between sealing element and the outer, second gypsum board.

An empty gap remains between the second component, for example a ceiling, a wall or a floor, and the outer, second gypsum board. This gap is completely available to absorb movement in the case of a vertical movement of the second component or the gypsum boards.

Depending on how far the outer, second gypsum board covers the sealing element (size of the offset), movement in the other direction can also be absorbed. It is important that in this case, coverage between the second gypsum board and the joint sealing tape remains guaranteed. Preferably, therefore, the dimension of the sealing element is selected so that its thickness is slightly greater than the thickness of a gypsum board, and its height comprises slightly more than the maximally permissible movement of the components (maximal joint width).

Because the thickness of the sealing element is greater than the thickness of the gypsum board, the gypsum board is pressed against the sealing element during its installation and compressed slightly, thereby reliably sealing the gap between sealing element and gypsum board, particularly with regard to gases.

For easier setting of the correct joint dimension in the case of the outer, second gypsum board, markings can be applied laterally on the joint sealing tape; these are called positioning markings. To improve the seal and/or the sliding properties, the sealing tape can be laminated on one side with a layer composed of a material that neither hinders the movement of the gypsum board nor is destroyed by the latter, such as a plastic film. The positioning marking for the outer, second gypsum board can easily be applied to a film for example.

In this method of installation, maximal absorption of expansion, in comparison with the joint width, is possible.

Furthermore, this method of installation is very easy to use, for one thing because the first gypsum board can easily be installed to have contact with the sealing element, without any distance measurement. For another thing, particularly when using a positioning marking, the second gypsum board can also be installed without a distance measurement. Furthermore, this method of installation results in the greatest possible freedom in the selection of the material for the sealing elements, because these are only compressed slightly and therefore only low demands are made with regard to compressibility of the sealing element.

According to the invention, the joint sealing tape can be used on all types of connection joints in which one component meets another component. Accordingly, the joint sealing tape can be used on all profiles, also closed profiles or wooden beams, which must be sealed relative to a connection surface.

A particularly preferred use of the joint sealing tape therefore relates to sealing the profiles in drywall construction, wherein the first component is a ceiling profile, floor profile or wall profile or a metal or wood framework of a drywall element, and the second component is a floor, a ceiling or a wall of a component, for example a masonry construction or concrete component. The profile can be any one of the profiles for drywall construction that are usually used, independent of whether it has a slit or non-slit crosspiece or a slit or non-slit flange. The further components are gypsum boards that lie tightly against the profiles and are attached to the framework. In order to permit vertical movement of the gypsum boards, for example in the event of an earthquake, the gypsum boards are installed at a distance from a wall, a floor or a ceiling, with vertical mobility. In this way, a gap occurs (also called a joint herein) between the gypsum board and the wall, the floor or the ceiling. This joint is filled by the sealing element of the joint sealing tape, so that the sealing element seals the joint with regard to noise and/or smoke, and, depending on the material of the joint sealing tape, if applicable also with regard to fire.

Without restricting the scope of protection of the invention, the invention will be described in greater detail using special embodiments of the joint sealing tape. In these embodiments, the joint sealing tape is used on the connection joints of drywall walls. It is clear to a person skilled in the art that the sealing tape can also be used for other types of building joints.

Figure 1A:
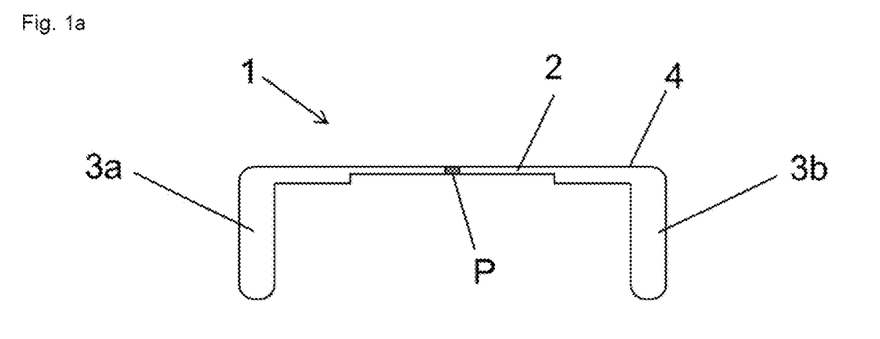
FIG. 1a shows a schematic front view of a joint sealing tape according to an embodiment of the present invention, wherein the sealing elements have a solid profile and a rectangular profile having rounded corners, and the connection element has a perforation.
Figure 1B:
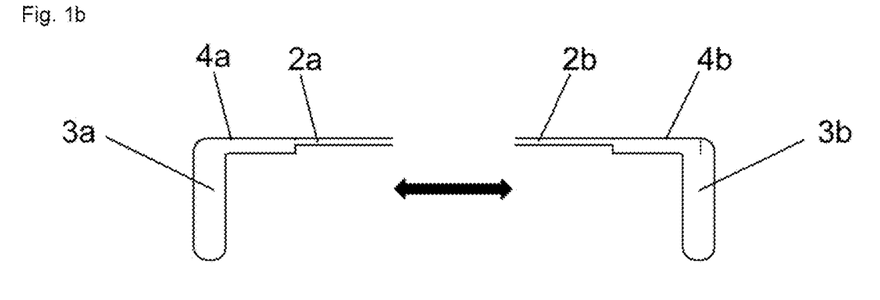
FIG. 1b shows a schematic front view of a separated joint sealing tape (two joint sealing tape halves) according to an embodiment of the present invention, wherein the sealing element has a solid profile and a rectangular profile having rounded corners, in each instance.
Figure 1C:
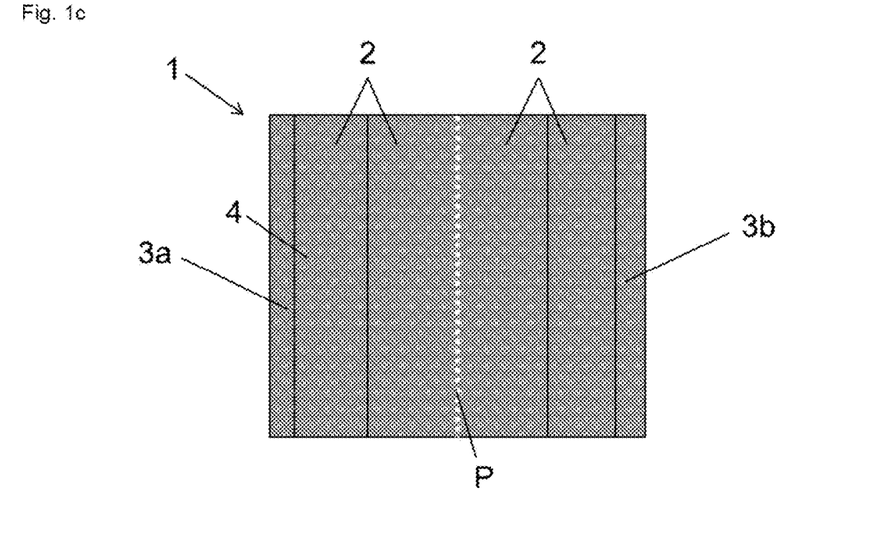
FIG. 1c shows a schematic bottom view of a joint sealing tape according to an embodiment of the present invention, wherein the connection element has a perforation.

In FIGS. 1a to 1c, a preferred embodiment of a joint sealing tape 1 according to the invention is shown. The joint sealing tape 1 in FIG. 1a has two sealing elements 3a and 3b, which are positioned on the outer edges of the connection element 2. The sealing elements 3a and 3b have a rectangular profile having rounded corners and a solid profile, wherein the connection element 2 is positioned laterally on the sealing elements 3a and 3b. Furthermore, the sealing elements 3a and 3b and connection element 2 are produced in one piece and consist of a compressible foam material, which contains fire protection additives, if applicable. The joint sealing tape 1 is completely sheathed by a plastic film 4 and has a perforation (P) in the longitudinal direction of the joint sealing tape 1. FIG. 1b shows the joint sealing tape 1 from FIG. 1a separated at the perforation (two joint sealing tape halves), wherein the two joint sealing tape halves both a sealing element 3a, 3b, a part 2a, 2b of the connection element 2, and are partially sheathed with plastic film 4a, 4b, in each instance. FIG. 1c shows a schematic bottom view of the joint sealing tape 1 according to the embodiment of FIG. 1a.

Figure 2A:
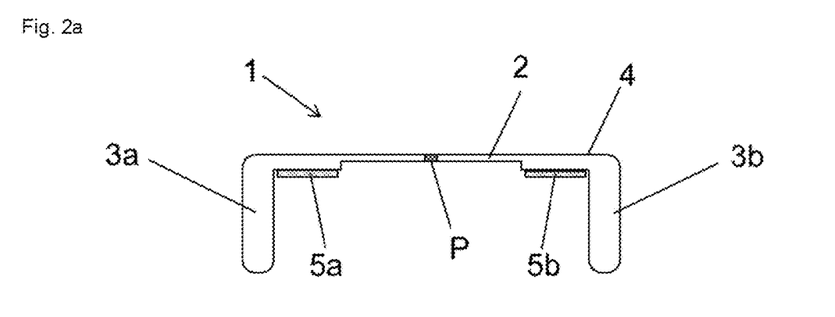
FIG. 2a shows a schematic front view of a joint sealing tape according to an embodiment of the present invention, wherein the sealing elements have a solid profile and a rectangular profile having rounded corners, and the connection element has a perforation and two self-adhesive fixtures.
Figure 2B:
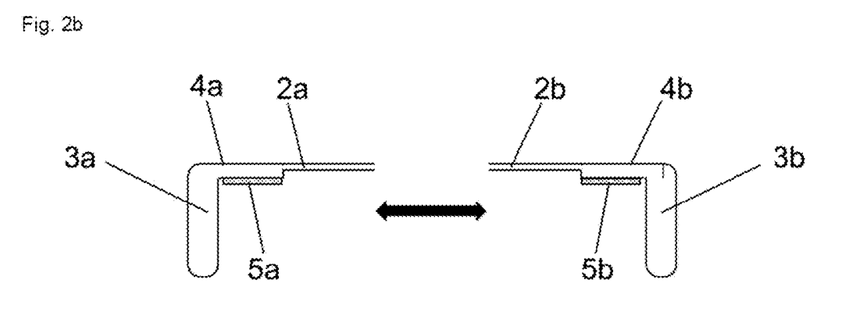
FIG. 2b shows a schematic front view of a separated joint sealing tape (two joint sealing tape halves) according to an embodiment of the present invention, wherein the sealing element has a solid profile and a rectangular profile having rounded corners, and the connection element has a self-adhesive fixture, in each instance.
Figure 2C:
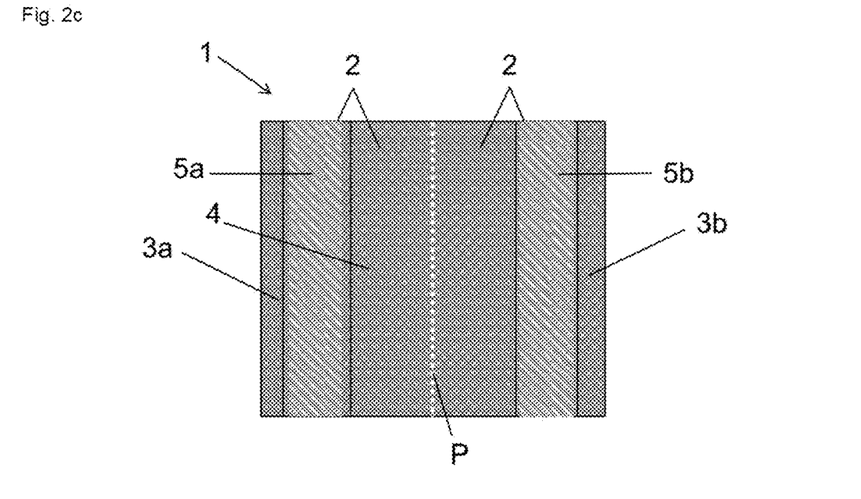
FIG. 2c shows a schematic bottom view of a joint sealing tape according to an embodiment of the present invention, wherein the connection element has a perforation and two self-adhesive fixtures.

In FIGS. 2a to 2c, a preferred embodiment of a joint sealing tape 1 according to the invention is shown. The joint sealing tape 1 in FIG. 2a has two sealing elements 3a and 3b, which are positioned on the outer edges of the connection element 2. The sealing elements 3a and 3b have a rectangular profile having rounded corners and a solid profile, wherein the connection element 2 is positioned laterally on the sealing elements 3a and 3b. Furthermore, the sealing elements 3a and 3b and connection element 2 are produced in one piece and consist of a compressible foam material, which contains fire protection additives, if applicable. The joint sealing tape 1 is completely sheathed by a plastic film 4 and has a perforation (P) in the longitudinal direction of the joint sealing tape 1. The connection element 2 has self-adhesive fixtures in the form of adhesive strips 5a, 5b. FIG. 2b shows the joint sealing tape 1 from FIG. 2a separated at the perforation (two joint sealing tape halves), wherein the two joint sealing tape halves both have a sealing element 3a, 3b, both have a part 2a, 2b of the connection element 2, and are partially sheathed with plastic film 4a, 4b, in each instance, and both have a self-adhesive fixture 5a, 5b. FIG. 2c shows a schematic bottom view of the joint sealing tape 1 according to the embodiment of FIG. 2a.

Figure 3A:
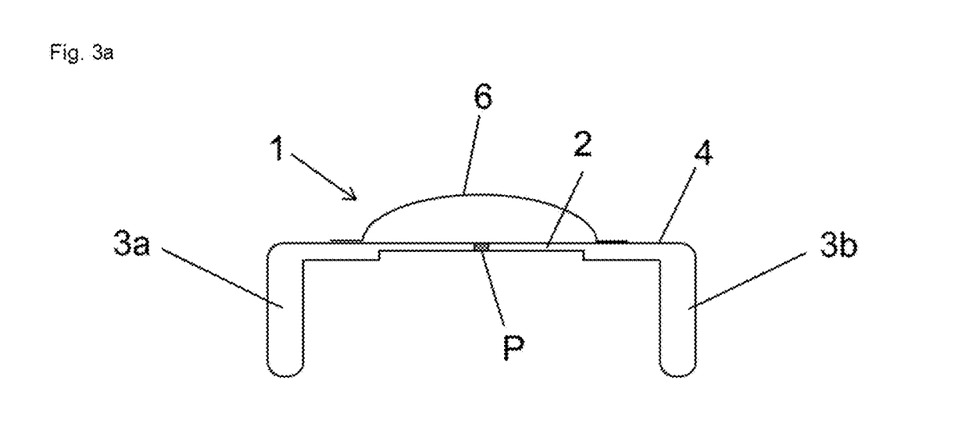
FIG. 3a shows a schematic front view of a joint sealing tape according to an embodiment of the present invention, wherein the sealing elements have a solid profile and a rectangular profile having rounded corners, the connection element has a perforation and a widening element.
Figure 3B:
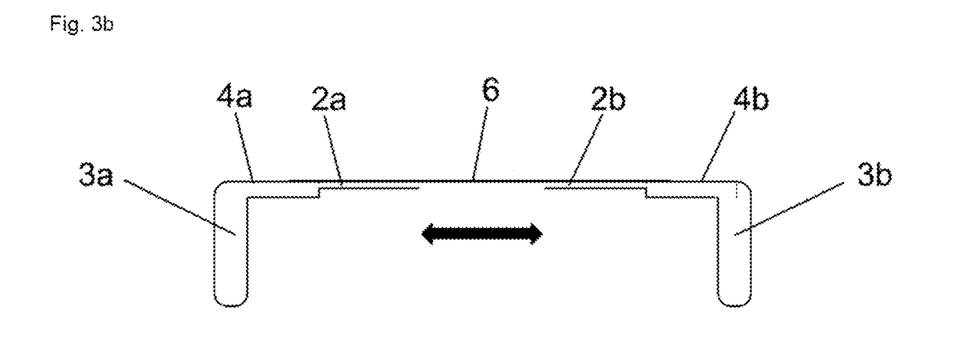
FIG. 3b shows a schematic front view of a pulled-apart joint sealing tape according to an embodiment of the present invention, wherein the sealing elements have a solid profile and a rectangular profile having rounded corners, and wherein the widening element connects the two separated joint sealing tape halves.

In FIGS. 3a and 3b, a preferred embodiment of a joint sealing tape 1 according to the invention is shown. FIG. 3a shows a schematic front view of a joint sealing tape 1, wherein the sealing elements 3a and 3b are positioned on the outer edges of the connection element 2. The sealing elements 3a and 3b have a rectangular profile having rounded corners and a solid profile, wherein the connection element 2 is positioned laterally on the sealing elements 3a and 3b. Furthermore, the sealing elements 3a and 3b and connection element 2 are produced in one piece and consist of a compressible foam material, which contains fire protection additives, if applicable. The joint sealing tape 1 is completely sheathed by a plastic film 4 and has a perforation (P) in the longitudinal direction of the joint sealing tape 1 and a widening element 6 composed of a plastic film, which is attached on the top of the connection element 2. FIG. 3b shows the joint sealing tape 1 from FIG. 3a, separated at the perforation, wherein the two joint sealing tape halves both have a sealing element 3a, 3b, both have a part 2a, 2b of the connection element 2, and are partially sheathed with plastic film 4a, 4b, in each instance, and wherein the widening element 6 connects the two separated joint sealing tape halves.

Figure 4A:
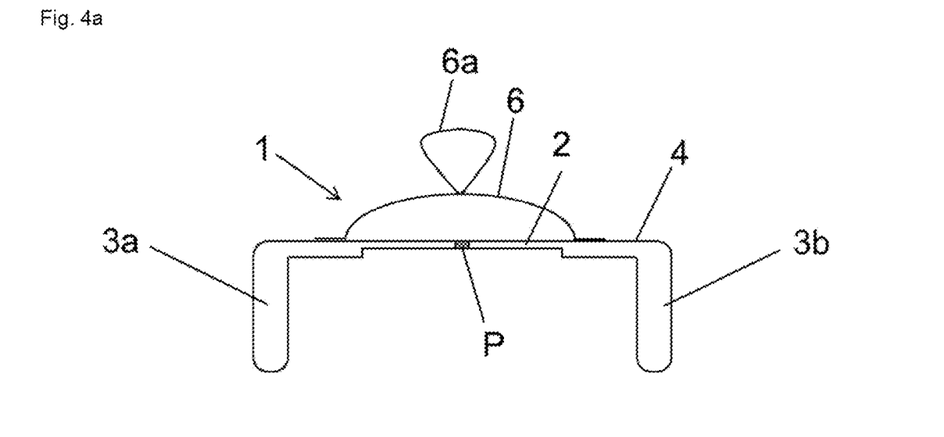
FIG. 4a shows a schematic front view of a joint sealing tape according to an embodiment of the present invention, wherein the sealing elements have a solid profile and a rectangular profile having rounded corners, the connection element has a perforation and a widening element, and wherein the widening element has a further widening loop.
Figure 4B:
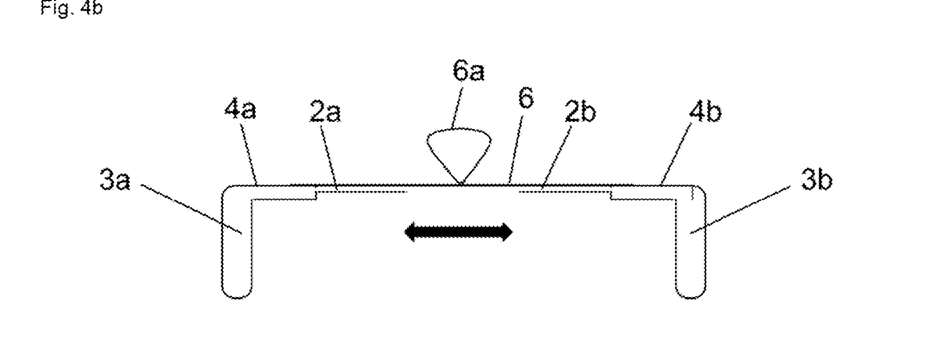
FIG. 4b shows a schematic front view of a pulled-apart joint sealing tape according to an embodiment of the present invention, wherein the sealing elements have a solid profile and a rectangular profile having rounded corners, and wherein the widening element connects the two separated joint sealing tape halves and has a further widening loop.
Figure 4C:
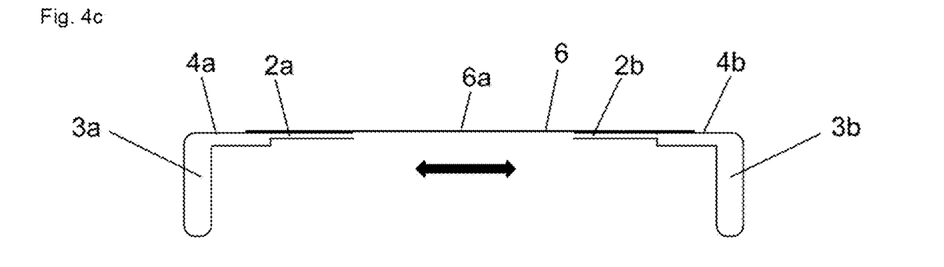
FIG. 4c shows a schematic front view of a joint sealing tape according to an embodiment of the present invention, pulled apart twice, wherein the sealing elements have a solid profile and a rectangular profile having rounded corners, and wherein the widening element connects the two separated joint sealing tape halves.

In FIGS. 4a to 4c, a preferred embodiment of a joint sealing tape 1 according to the invention is shown. FIG. 4a shows a schematic front view of a joint sealing tape 1, wherein the sealing elements 3a and 3b, which are positioned on the outer edges of the connection element 2. The sealing elements 3a and 3b have a rectangular profile having rounded corners and a solid profile, wherein the connection element 2 is positioned laterally on the sealing elements 3a and 3b. Furthermore, the sealing elements 3a and 3b and connection element 2 are produced in one piece and consist of a compressible foam material that contains fire protection additives, if applicable. The joint sealing tape 1 is completely sheathed by a plastic film 4 and has a perforation (P) in the longitudinal direction of the joint sealing tape 1 and a widening element 6 composed of a plastic film, which is attached to the top of the connection element 2. Furthermore, the joint sealing tape 1 has a further widening element 6a in the form of a loop, which consists of plastic film. FIG. 4b shows the joint sealing tape 1 from FIG. 4a separated at the perforation, wherein the two joint sealing tape halves both have a sealing element 3a, 3b and are partially sheathed with plastic film 4a, 4b, in each instance, and wherein the widening element 6 lengthens a part 2a, 2b of the connection element 2, in each instance, and holds the two separated joint sealing tape halves together. The further widening element 6a in the form of a loop is available for further widening of the connection element 2. This further widening is shown in FIG. 4c. The further widening element 6a now lengthens the widening element 6 and a part 2a, 2b of the connection element 2, in each instance, and thereby connects the two separated joint sealing tape halves. The dimension of the loops 6 and 6a is sized in such a manner that after the two joint sealing tape halves are pulled apart by means of separation of the perforation of the connection element, the desired width for different alternative profiles occurs.

Figure 5A:
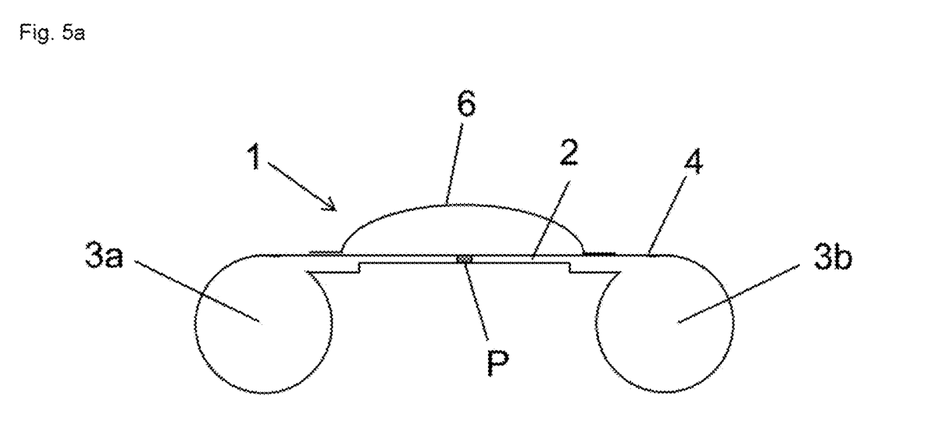
FIG. 5a shows a schematic front view of a joint sealing tape according to an embodiment of the present invention, wherein the sealing elements have a solid profile and a round profile, and the connection element has a perforation and a widening element.
Figure 5B:
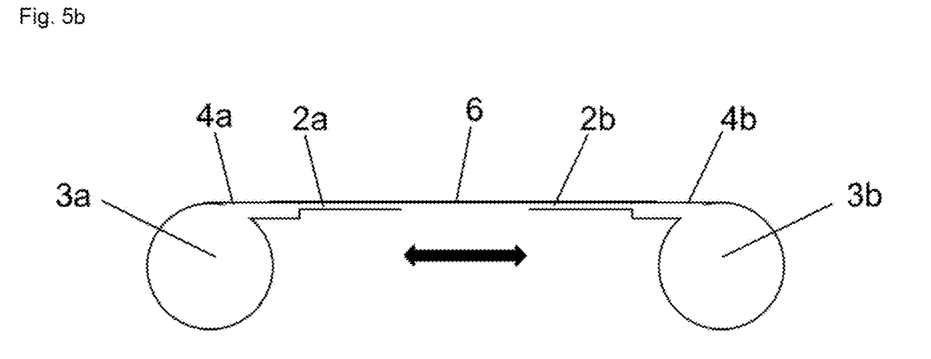
FIG. 5b shows a schematic front view of a pulled-apart joint sealing tape according to an embodiment of the present invention, wherein the sealing elements have a solid profile and a round profile, and wherein the widening element connects the two separated joint sealing tape halves.

In FIGS. 5a and 5b, a preferred embodiment of a joint sealing tape 1 according to the invention is shown. FIG. 5a shows a schematic front view of a joint sealing tape 1, wherein the sealing elements 3a and 3b are positioned on the outer edges of the connection element 2. The sealing elements 3a and 3b have a round profile and a solid profile, wherein the connection element 2 is positioned laterally on the sealing elements 3a and 3b. Furthermore, the sealing elements 3a and 3b and connection element 2 are produced in one piece and consist of a compressible foam material, which contains fire protection additives, if applicable. The joint sealing tape 1 is completely sheathed by a plastic film 4 and has a perforation (P) in the longitudinal direction of the joint sealing tape 1 and a widening element 6 composed of a plastic film, which is attached to the top of the connection element 2. FIG. 5b shows the joint sealing tape 1 from FIG. 5a, separated at the perforation, wherein the two joint sealing tape halves both have a sealing element 3a, 3b, both have a part 2a, 2b of the connection element 2, and are partially sheathed with plastic film 4a, 4b, in each instance, and wherein the widening element 6 connects the two separated joint sealing tape halves.

Any geometrical and material configuration of the sealing elements and of the connection element mentioned above can be combined and used as desired, in order to make a joint sealing tape according to the present invention available.

Figure 6:
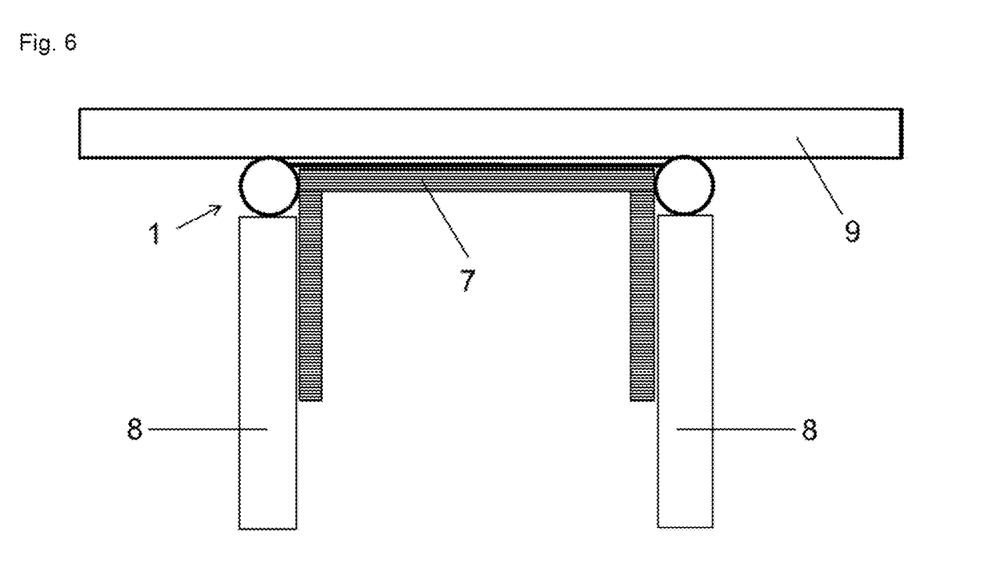
FIG. 6 shows a sectional view through a finished component with the embodiment of a joint sealing tape according to the invention shown in FIG. 5a or 5b.

FIG. 6 shows a sectional view through a finished component having the embodiment of a joint sealing tape according to the invention shown in FIG. 5a or 5b. In particular, FIG. 6 shows the positioning of an embodiment of the joint sealing tape 1 according to the invention in a connection joint in the case of drywall walls. To seal the gap between a ceiling 9, the U profile 7 of a drywall framework, and the gypsum boards 8, in a first step the joint sealing tape 1 is laid into the crosspiece of the U profile 7 and attached to the ceiling 9 in usual manner, for example by screwing it on or nailing it on, together with the profile, in a second step. Then, in a final step, the gypsum boards 8 are laid against the flange of the U profile 7, pushed upward in the direction of the ceiling 9, wherein a gap remains between the top edge of the gypsum board 8 and the ceiling 9, which gap is filled with the sealing elements 3a and 3b of the joint sealing tape 1, in order to permit vertical movement of the gypsum board 8, for example. As a result, the sealing elements 3a and 3b are compressed and thereby seal the gap between the ceiling 9 and the U profile 7 and the gap between the ceiling 9 and the gypsum board 8.

As is evident from the above explanations, the joint sealing tape according to the invention is particularly suitable for reliably sealing a building joint between two adjacent components, in simple manner, particularly with regard to noise and/or smoke and also with regard to fire, if applicable, and, at the same time, can be universally used for different profile widths.

In particular, the joint sealing tape according to the invention can be universally used for different profile widths of a U profile of a drywall framework, particularly for the usual profile widths of 2½ inches (64 mm), 3⅝ inches (92 mm), 4 inches (102 mm), 6 inches (152 mm), 8 inches (203 mm), and 10 inches (254 mm). By means of the joint sealing tape according to the invention, a universal product for different profile sizes and applications is made available, which can furthermore be cost-advantageously produced on a production line.

Furthermore, this method of installation is very easy to use, because no additional attachment of the joint sealing tape, for example to the profile or to the ceiling is required. Application of the joint sealing tape to a profile, for example, with precise fit, is also not necessary due to the self-centering of the joint sealing tape that occurs during installation of the profile on a component. Installation is therefore as easy as can be imagined, and the work effort for installation of the joint sealing tape is clearly reduced. Therefore, secure and reliable sealing of joints between two components, particularly between a profile of a drywall framework and a component that borders on it, such as a ceiling, wall or floor, is achieved by using the invention. In this regard, sealing on both sides can be achieved in a single work step, in that a prefabricated sealing element is made available.

Furthermore, it has been shown that excellent sealing can be achieved with the joint sealing tape according to the invention, because good compressibility of the sealing elements is guaranteed by the selection of the sealing materials and/or the geometrical configuration, without any additional aids. The invention also allows setting the correct distance from the gypsum board to the connecting component, without additional aids, in order to achieve the aforementioned precompression, by means of a suitable selection of the sealing materials and/or the geometrical configuration.

With the joint sealing tape according to the invention, it can also be ensured that sufficient material is installed to guarantee excellent sealing with maximal expansion absorption, and that this is already achieved by the selection of the sealing materials and/or geometrical configuration.

Furthermore, with the joint sealing tape according to the invention, uneven areas of a component surface can already be securely sealed off when a component is placed against another component, because the sealing elements of the joint sealing tape are pressed against the surface of the one component in sufficiently firm manner and, at the same time, pressed against the side surface of the other component.

In view of the above, it is evident that the objects of the invention are solved. Because various modifications of the joint sealing tape described above can be made without deviating from the scope of the invention, the intention is that all the objects contained in the above description are interpreted as illustrations and not in a restrictive sense.

The invention claimed is:

1. A joint sealing tape for sealing a joint between a first component and a second component, said joint sealing tape comprising:

an elongated connection element and at least two sealing elements, which are positioned on the connection element at a distance from and next to one another, running in a longitudinal direction of the connection element, wherein the connection element has a perforation, and
wherein the perforation is located within a central segment of the connection element and is configured to improve ease of separation of two halves of the joint sealing tape.

2. The joint sealing tape according to claim 1, wherein the sealing elements have a predetermined geometry.

3. The joint sealing tape according to claim 1, wherein the sealing elements are positioned on an outer edge of the connection element.

4. The joint sealing tape according to claim 1, wherein the sealing elements are firmly connected with the connection element at least over part of their circumference.

5. The joint sealing tape according to claim 1, wherein the sealing elements have a solid profile.

6. The joint sealing tape according to claim 1, wherein the sealing elements have a round profile, oval profile or a rectangular profile having rounded corners.

7. The joint sealing tape according to claim 1, wherein the sealing elements consist of a deformable material.

8. The joint sealing tape according to claim 7, wherein the sealing elements consist of a slow-burning foam material.

9. The joint sealing tape according to claim 7, wherein the sealing elements consist of an intumescent material.

10. The joint sealing tape according to claim 1, wherein the connection element consists of a deformable material, a plastic film, a woven fabric, or a nonwoven fabric.

11. The joint sealing tape according to claim 1, wherein the sealing elements and the connection element consist of one material in one piece, and are sheathed with a plastic film.

12. The joint sealing tape according to claim 1, wherein the connection element further comprises at least one widening element.

13. The joint sealing tape according to claim 12, wherein the widening element is present in the form of a loop.

14. The joint sealing tape according to claim 12, wherein the widening element consists of a deformable material, a plastic film, a woven fabric, or a nonwoven fabric.

15. The joint sealing tape according to claim 1, wherein the sealing elements and have a rectangular profile having rounded corners and a solid profile, the connection element consists of an open-cell polyurethane foam, the sealing elements and consist of an open-cell polyurethane foam, and the joint sealing tape is sheathed with a plastic film.

16. The joint sealing tape according to claim 12, wherein the widening element consists of a plastic film.

17. The joint sealing tape according to claim 1, wherein a contact region between the sealing element and the connection element has a width in the range of about 30 mm to about 300 mm.

18. A sealing arrangement for sealing a joint between two components adjacent to one another, having at least a first component, a second component, and a joint sealing tape according to claim 1, wherein the sealing elements and are positioned in the upper region of the joint, and configured for sealing the joint from the outside.

19. The sealing arrangement according to claim 18, wherein the sealing elements and are disposed laterally on the first component.

20. The sealing arrangement according to claim 18, wherein the first component is a frame profile of a drywall wall, and the second component is a wall, a ceiling or a floor of a building.

* * * * *